INVENTOR.
José Rosán
BY
ATTORNEY

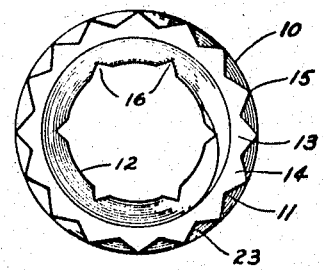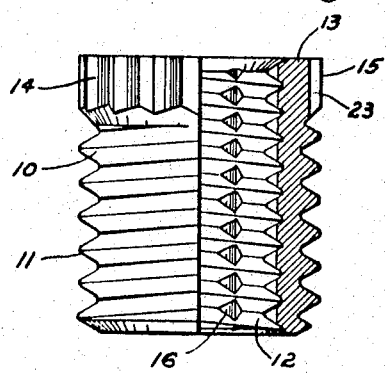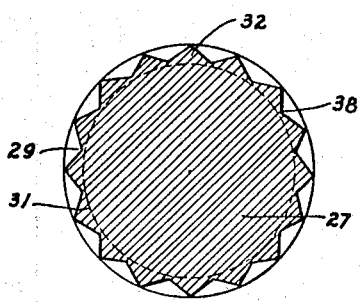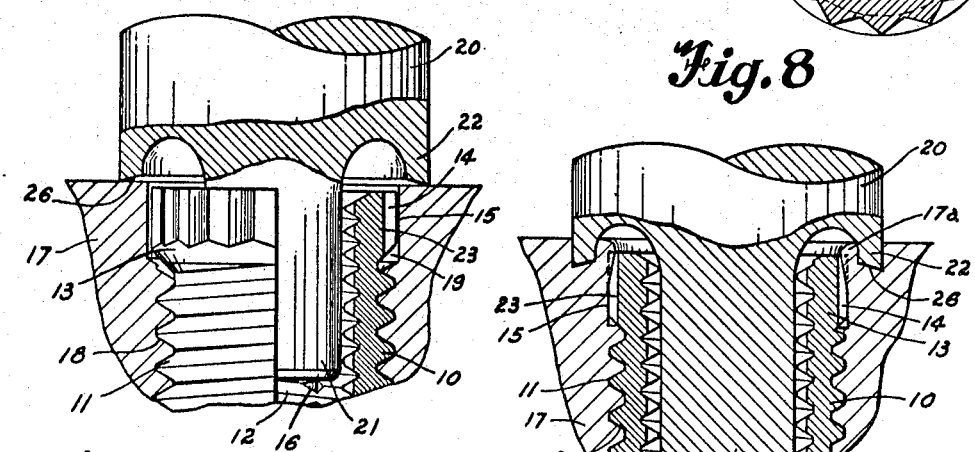

INVENTOR.
José Rosán
BY
ATTORNEY

Patented Sept. 5, 1967

3,339,436
TOOL FOR LOCKING THREADED FASTENERS
IN A WORKPIECE
Jose Rosan, San Juan Capistrano, Calif., assignor to Rosan
Engineering Corp., Newport Beach, Calif., a corporation of California
Original application Jan. 8, 1965, Ser. No. 424,266, now
Patent No. 3,281,173, dated Oct. 25, 1966. Divided and
this application Apr. 11, 1966, Ser. No. 541,627
3 Claims. (Cl. 81—3)

ABSTRACT OF THE DISCLOSURE

This invention relates to tools for securing a fastener into a workpiece by penetration thereof into the workpiece material in order to obtain a flow of the material and compact the same into integral serrations carried by the fastener, thereby locking the same against both axial and rotational displacement.

---

This application is a division of pending application Ser. No. 424,266, filed Jan. 8, 1965, now Patent No. 3,281,173, entitled, Insert Having an Integral Locking Collar.

This invention relates to tools for locking threaded fasteners in the bore of a workpiece.

More particularly, the present invention is directed to tools for securing a fastener into a workpiece by penetration of the workpiece material in order to obtain a flow of the material into integral teeth or serrations carried by the fastener, thereby locking the same against both axial and rotational displacement.

In the past, solutions to the problem of locking threaded fasteners into workpieces or bodies of parent material have included the use of such devices as keys, and the use of serrated collars employed in conjunction with internally and externally serrated lock rings. These devices, however, required the use of separate parts with the attendant inventory and stocking problems. To overcome these problems, one-piece fasteners were developed having integral locking means such as swaging or outwardly expanding serrated heads into the bore of a workpiece. However, in some instances it was found that the structure of the fastener or the location of the fastener in a workpiece prohibited the outward expansion or swaging of the fastener head or collar, or the use of a key or a separate locking ring part. Also, in some instances, where it was desired that the internal threads of an insert type fastener be continuous throughout the internal bore thereof, swaging or outwardly expanding any part of the insert would tend to distort and deform the aforesaid internal threads. The insert would then be unusable in that it would be extremely difficult to thread a fastener therein due to the interference of the distorted or deformed internal threads.

The fastener of the present invention, when in the embodiment of a tubular insert, may have a thick wall or a thin wall or, as in the case of a stud fastener, may be solid throughout. The fastener is characterized in that it may be locked into the bore of a workpiece without the use of keys or separate locking rings. Further, although some embodiments of the present invention are capable of having the collars thereof expanded into the workpiece, the fastener collar and head may be stationary and the workpiece material may be compacted into said collar so as to lock the fastener against axial or rotational displacement.

As aforesaid, in the instant invention the material of the workpiece is deformed or compacted into the serrations provided by the integral locking collar of the fastener. The workpiece material so compacted or deformed is maintained in integral relationship with the main body of the workpiece material and is situated between the aforesaid serrations, thereby preventing rotational displacement of the fastener.

Although the initial alignment of the serration faces of the locking collar may be angled inwardly, outwardly or longitudinally relative to the axis of the fastener, in the case of longitudinal or inwardly facing serrations, it is necessary that the serrations of the fastener collar be slightly below the workpiece surface so that the compaction tool will lap a portion of the workpiece material over the outermost end of the serrations so as to form a retaining ring of integral workpiece material, thereby prohibiting axial displacement of the fastener.

The workpiece material may be of any suitable material which is relatively softer than the fastener and is capable of being cold formed, or capable of cold flow. However, in the case of some nonmetallic materials, i.e., thermoplastics, etc., the workpiece material may be hot formed by appropriate hot tooling in order to flow the workpiece material inwardly into close association with the locking means of the fastener. Where the head or collar of a fastener, as for example in the case of a tubular insert, is desired to be expanded outwardly while radially deforming the workpiece material inwardly and simultaneously with the outward expansion of the insert collar, the co-action between the insert locking means and the workpiece material insures a positive torque preventive lock.

When expanding the locking head or collar of a thick walled tubular insert, an annular external groove is provided having a depth greater than that of the external thread thereof to insure that the head will preferentially expand relative to the threaded body portion of the insert. Such an annular external groove is not employed in conjunction with an internal locking or interference thread, but is instead disposed outwardly of a cylindrical counterbore, the result being that the wall of the insert inwardly of the annular groove is relatively thin in comparison to the remainder of the insert wall. Thus, despite the substantial thickness of the main body of the insert wall, it is possible and practical to expand a portion of the insert adjacent the annular groove in preference to the threaded body portion, thereby effecting a locking action relative to the parent material.

Accordingly, it is an object of the present invention to provide a simple tool for effecting locking of a serrated fastener in a workpiece by causing a flow of such material into locking engagement with said serrations.

Still another object is to provide a simple tool for effecting the locking of a serrated fastener in a workpiece by simultaneous convergent displacement of a portion of the fastener wall and a portion of the workpiece material.

Other objects and advantages will be readily apparent from the following description taken in conjunction with the accompanying drawings, in which:

FIG. 1 is an elevational view, partly sectioned, of a fastener constructed in accordance with the present invention;

FIG. 2 is a top plan view of the fastener of FIG. 1;

FIG. 3 is an elevational view, partly sectioned, illustrating a locking tool in position to effect locking of a fastener similar to that of FIGS. 1 and 2 into a workpiece;

FIG. 4 is an elevational view, partly sectioned, of the fastener and tool of FIG. 3, illustrating the convergent flow of the workpiece material which occurs upon penetration of the peripheral portion of the locking tool into the workpiece and the simultaneous overlapping of the workpiece material over the outermost end of the fastener;

FIG. 7 is an elevational view, partly sectioned, illustrating a stud type fastener embodying the principles of the invention;

FIG. 8 is a sectional view taken on the line 8—8 of the fastener of FIG. 7;

Figure 5:
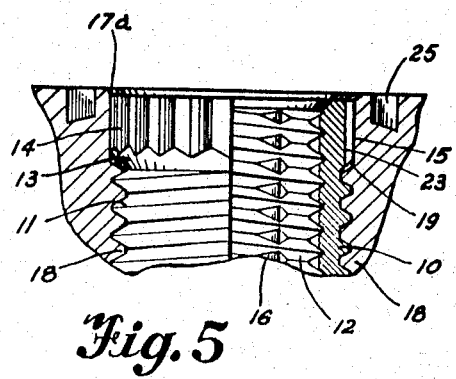
FIG. 5 is an elevational view, partly sectioned, showing the fastener of FIGS. 1–4 in a locked position in the workpiece as the result of the operations illustrated in FIGS. 3 and 4.

Referring to FIGS. 1 and 2, a threaded fastener is illustrated having a tubular shank 10 which is formed with an external thread 11 and an internal thread 12. Integrally formed at one end of shank 10 is a collar 13, the cylindrical external surface of which is knurled or longitudinally serrated to form serrations 14 having roots 23. In the illustrated embodiment, the apex edges or crests 15 of serrations 14 extend parallel to the axis of the fastener.

Internal thread 12 is provided with a plurality of longitudinal grooves or flutes 16 adapted to receive a generally hexagonal driving tool (not shown) of suitable construction. The driving tool may also be generally square, or have any desired number of sides, the number and spacing of grooves or flutes 16 being altered accordingly.

FIGS. 3–6, inclusive, illustrate a method and tool for effecting locking of the fastener of FIGS. 1 and 2 in a workpiece or body of parent material 17. Workpiece 17 is formed with an internally threaded bore 18 adapted to receive the external thread 11 of the fastener, and also with a counterbore 19 adapted to receive collar 13. The diameter of counterbore 19 is sufficient so that the collar 13 and serrations 14 may be received therein without forcing or binding.

The tool 20 for effecting locking of the insert in workpiece 17 comprises a cylindrical pilot portion 21 adapted to be received in the internally threaded portion of the fastener. If it is also desirable to radially and outwardly expand collar 13 into the workpiece 17 simultaneously with the inward compaction of a portion of the workpiece material adjacent thereto, a counterbore is then provided as in FIGS. 13 and 14 and the swaging tool (expanding tool) would be provided with a generally frusto-conical swaging portion as indicated in FIG. 14. In FIGS. 3 and 4, the tool further comprises a generally annular workpiece penetrating portion 22 adapted to be inserted into the workpiece radially outwardly of counterbore 19, in order to effect inward flow or compaction of a portion of the workpiece material adjacent the workpiece bore 18. In FIG. 3 the locking tool 20 is illustrated in a position just prior to axial displacement of penetrating portion 22 into the workpiece 17.

The tool shown in FIG. 4 is at its lowermost position, with the portion 22 penetrating into the workpiece to effect inward flow of the workpiece material into intimate contact with serrations 14 of collar 13, thereby providing a torque resistant lock.

Figure 6:
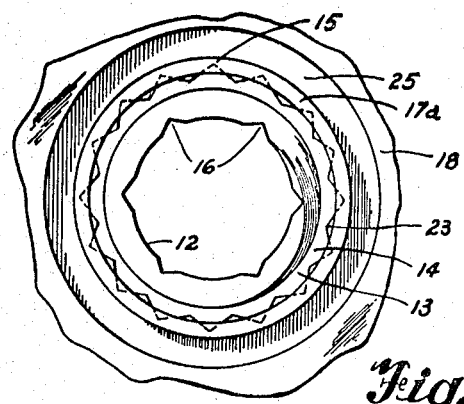
FIG. 6 is a top plan view of the fastener of FIG. 5 fully locked into the workpiece.

As shown in FIGS. 4–6, inclusive, the inward flow or compaction of the workpiece material fills the roots 23 of serrations 14 and simultaneously displaces a portion of the workpiece 17 into an integral retaining ring 17a so as to overlap at least a portion of collar 13. The fastener is thus locked rigidly in the workpiece 17, capable of resisting displacement by both axial and rotational forces.

The annular groove created by the workpiece penetrating portion 22 of the locking tool is indicated at 25 in FIGS. 5 and 6. This groove is formed by the penetration portion 22 of tool 20 which has concentric cylindrical side walls, and a lower wall or face 26 which is generally frusto-conical and diverges downwardly at a steep angle (FIGS. 3 and 4). The bottom wall of the annular groove 25 is thus correspondingly frusto-conical, as shown in FIG. 5.

In FIGS. 7 and 8, a fastener element is illustrated which has a threaded shank 27 and a collar 28, which generally correspond to shank 10 and collar 13, respectively, of the fastener of FIGS. 1 and 2, but has a solid body, as indicated in FIG. 3. Furthermore, the collar 28 is integral with a cylindrical section 29, which in turn is integral with a second threaded outer shank section 30. An annular groove 31 is formed between collar 28 and the cylindrical section 29. As in the case of collar 13, collar 28 is formed with longitudinal serrations 32 having roots 38.

The fastener shown in FIGS. 7 and 8 operates as a stud bolt or the like. The stud bolt relationship occurs when the shank 27 and collar 28 are threadedly inserted into a workpiece and locked in position, as will be described subsequently relative to FIG. 9.

Figure 9:
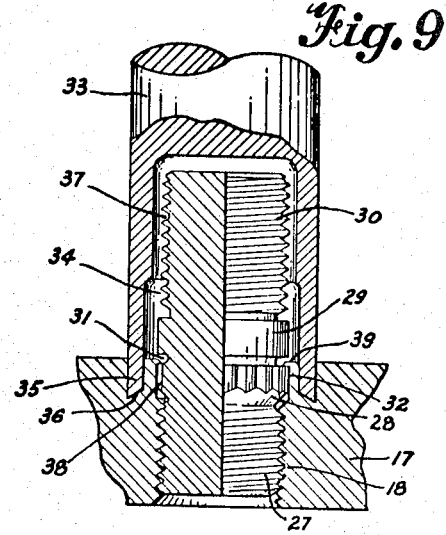
FIG. 9 is an elevational view, partly sectioned, of the stud type fastener of FIGS. 7 and 8, showing a locking tool positioned thereover, prior to locking the fastener in a workpiece.

Referring next to FIG. 9, a tool 33 is illustrated for effecting locking in workpiece 17 of the stud bolt fastener shown in FIGS. 7 and 8. The tool 33 is provided with a cavity 34 of sufficient depth and diameter to receive the cylindrical portion 29 and outer shank 30 of the stud bolt. The end 35 of the tool 33 is provided with a generally frusto-conical penetrating face or surface 36 which corresponds generally to the workpiece penetrating portion 22 of the tool shown in FIGS. 3 and 4. The cavity 34 in tool 33, at points spaced from penetrating face 36, has a sufficiently small diameter (at 37) to receive outer shank 30 in close fitting relationship. The wall of the cavity 34 thus serves as a pilot means to effect proper centering of face 36 relative to the fastener.

To lock the fastener shown in FIG. 9 with the tool 33, it is merely necessary to thread the inner shank 27 into threaded bore 18 of workpiece 17, and then axially force the tool 33 into the workpiece to effect an inward flow or compaction of workpiece material into groove 31, and the roots 38 of serrations 32. As in the case of the fastener of FIGS. 1–6, a portion of the workpiece 17 is simultaneously formed into an integral retaining ring 39, so as to overlap over collar 28 into groove 31. The fastener being thus rigidly locked in the workpiece 17, the projecting outer shank 30 serves as a stud bolt in the conventional manner.

Figure 10:
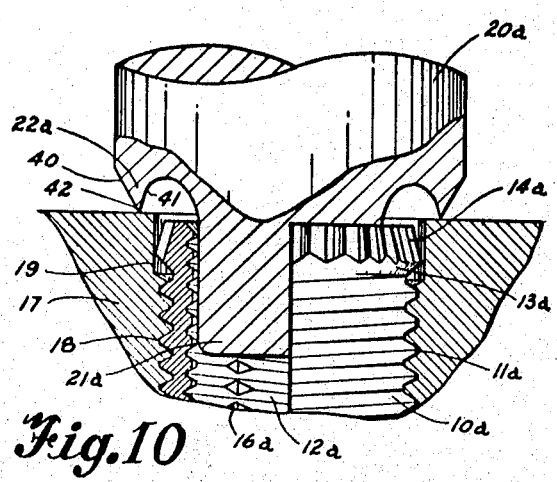
FIG. 10 is an elevational view, partly sectioned, of a fastener similar to FIG. 1, but having outwardly facing collar serrations and illustrating another embodiment of the locking tool of the present invention.
Figure 11:
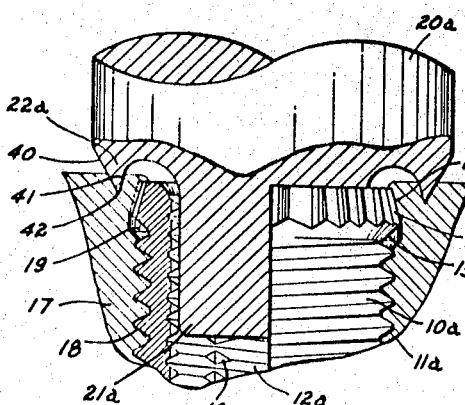
FIG. 11 is an elevational view, partly sectioned, of the fastener and locking tool of FIG. 10 after the displacement of workpiece material by the penetration of the locking tool therein, thereby locking the fastener into the workpiece.

In the embodiment of FIGS. 10 and 11, the fastener has a tubular shank 10a which is substantially identical to the shank 10 of the fastener of FIGS. 1 and 2, such shank being threaded into the threaded bore 18 of workpiece 17 which has a counterbore 19. The collar 13a, however, differs from the collar 13 of the fastener of FIGS. 1 and 2 in that the external surface is frustoconical in an upwardly convergent manner rather than cylindrical. Thus, the crests or ridges of serrations 14a are not parallel to the axis of the fastener, as in the embodiment of FIGS. 1 and 2, but are instead oblique thereto in such a manner that the hypothetical extensions of the crests would intersect the axis of the fastener above collar 13a.

The locking tool 20a of FIGS. 10 and 11 corresponds generally to that of FIGS. 3 and 4, having a pilot portion 21a and an annular workpiece penetrating portion 22a. Penetrating portion 22a, however, differs from that of FIGS. 3 and 4 in that it does not consist of any cylindrical portions, but instead has two intersecting frustoconical surfaces 40 and 41. Surface 40, the external surface, is downwardly convergent whereas internal surface 41 is downwardly divergent, so that such surfaces intersect at the relatively sharp edge indicated at 42.

Figure 12:
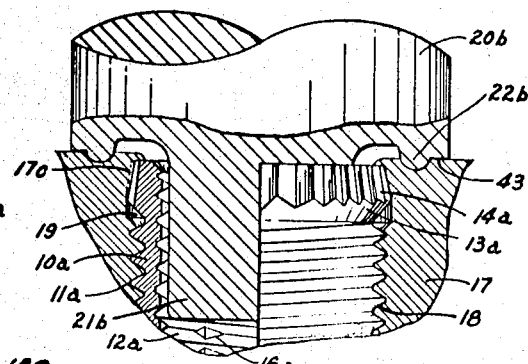
FIG. 12 is a view similar to FIG. 11, but ilustrating a form of locking tool in which the surface of the parent material is Brinelled or peened.

In using the insert and tool illustrated in FIGS. 10 and 11, it is merely necessary to thread the fastener into the threaded bore 18 of workpiece 17 until the upper surface of collar 13a is slightly below the surface of the workpiece, and then forcibly introducing the locking tool from the position illustrated in FIG. 10 to that illustrated in FIG. 11. Workpiece penetrating portion 22a, having the relatively sharp edge 42, then penetrates into the workpiece 17 and effects cold flow of metal into the spaces between the oblique serrations 14a. It should be noted that the inwardly convergent frustoconical configuration of collar 13a, as shown in FIGS. 10–12, provides another important feature. When the material of the workpiece is compressed inwardly, a substantial layer 17b of the workpiece material is formed over the insert top so as to form an integral annular retaining ring thereby. The insert is thus effectively locked against both axial and rotational displacement forces.

In the embodiment of FIG. 12, the workpiece and fastener are initially identical to that shown in FIGS. 10 and 11. The locking tool 20b, however, differs from the tools of FIGS. 10 and 11 in that the annular workpiece penetrating portion 22b has no sharp edges, but instead is rounded or radiused and is integral to the tool 20b. Stated otherwise, a vertical section of the penetrating portion 22b, taken at any location, is substantially a semicircle, as illustrated. Annular shoulder 43 of the locking tool 20b is adapted to seat on the workpiece surface during penetration of portion 22b. The pilot portion 21b of the embodiment of FIG. 12 is identical to those previously described with respect to FIGS. 3, 4, 10 and 11.

When the locking tool 20b is forced into workpiece 17 to the position shown in FIG. 12, the penetrating portion 22b penetrates into the workpiece, but does not result in any cutting thereof. Instead, the action is more in the nature of a compaction or Brinelling, and provides a "cold flow" of the workpiece material into the spaces between the serrations 14a, as well as forming a substantial portion of the workpiece material into an integral annular retaining ring 17c overlapping the end of the fastener.

Figure 13:
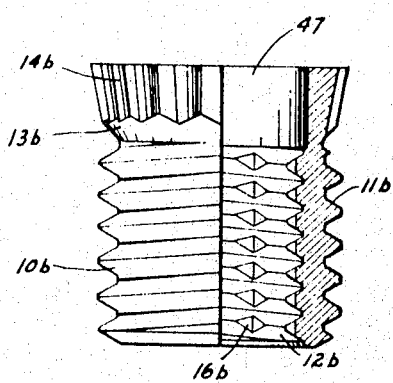
FIG. 13 is an elevational view, partly sectioned, of another embodiment of the fastener wherein the head or collar is frusto-conical and downwardly convergent.
Figure 14:
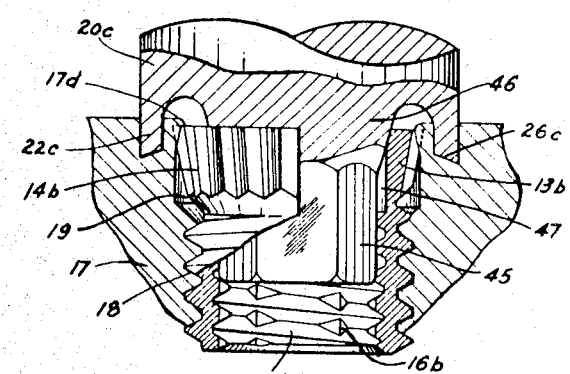
FIG. 14 is an elevational view, partly sectioned, illustrating the fastener of FIG. 13 being locked into the workpiece by a combination driving and locking tool.

The fastener shown in FIGS. 13 and 14 is identical to that previously described, except that the collar 13b is provided with serrations 14b, the crests or apex edges of which are downwardly convergent instead of parallel as in FIGS. 3 and 4, or downwardly divergent relative to the fastener axis as in FIGS. 10–12. Stated otherwise, the collar 13b has a generally frusto-conical external surface which diverges upwardly, such surface being knurled or longitudinally serrated to form the serrations 14b having the above described crest or apex relationship.

When using the fastener and locking tool shown in FIGS. 13 and 14, the fastener is first threaded into a suitable workpiece 17 having a counterbore 19 similar to that of the workpiece in FIG. 3. The locking tool 20c for effecting locking of the fastener in workpiece 17 comprises a combination hexagonal pilot and driving portion 45 which is adapted to be received in the internally threaded portion of the fastener. Tool 20c is further provided with a generally frusto-conical swage portion 46, which is adapted to be received in the counterbore 47 to effect outward expansion of the collar 13b. In addition, tool 20c is comprised of a generally annular workpiece penetrating portion 22c which has an angled face 26c and is adapted to be embedded into the workpiece radially outwardly of counterbore 19 in order to effect an inward flow or deformation of the workpiece material 17. The displaced workpiece material is thus compacted into the spaces between the serrations 14b of collar 13b while the collar 13b is simultaneously expanded outwardly due to the operation of swage portion 46 of the locking tool.

If a tool similar to that illustrated in FIGS. 3 and 4 is utilized in locking the embodiment of the fastener in FIGS. 13 and 14 (i.e., wherein the tool is devoid of a swaging portion), then only the workpiece material 17 would be compacted or caused to flow inwardly, and the collar portion 13b would not be radially outwardly expanded. In any event, the embedding into the workpiece of the penetrating portion of either tool would cause a displacement of a portion of the workpiece material so as to overlap the outermost end of the fastener, thereby providing an integral annular retaining ring 17d.

Figure 16:
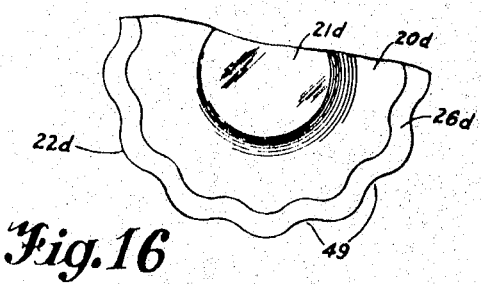
FIG. 16 is a bottom plan view of the locking tool of FIG. 15.
Figure 15:
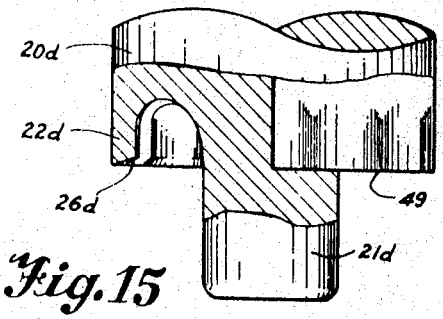
FIG. 15 is an elevational view, partly sectioned, illustrating the locking tool similar to that shown in FIGS. 3 and 4, except that the penetrating portion thereof is longitudinally fluted.

The tool illustrated in FIGS. 15 and 16 is similar to that illustrated in FIGS. 3 and 4, except that the penetrating portion 22d is provided with longitudinal flutes 49 around the periphery thereof, so that when the tool 20d is embedded into the workpiece material an undulating groove is formed rather than a smooth circular groove.

Figure 18:
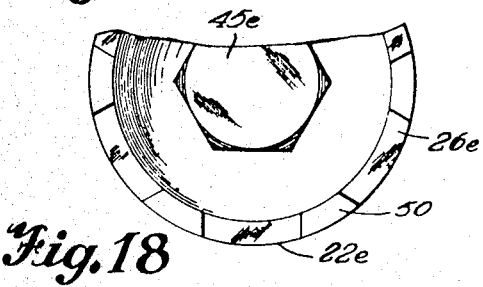
FIG. 18 is a bottom plan view of the combination driving and locking tool illustrated in FIG. 17.
Figure 17:
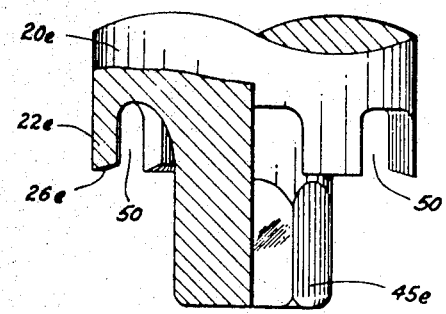
FIG. 17 is an elevational view, partly sectioned, illustrating a combination driving and locking tool, wherein the penetrating portion thereof is provided with a plurality of longitudinal rectangular notches.

FIGS. 17 and 18 illustrate an embodiment of the combination driving and locking tool similar to that of FIG. 14, with the exception that penetrating portion 22e is provided with a plurality of longitudinal notches 50 having a generally rectangular configuration. Although the tool 20e is provided with a combination hexagonal pilot and driving portion 45e similar to 45 in FIGS. 13 and 14, the tool is not provided with a swaging portion 46 as in FIG. 14. When tool 20e is embedded in the workpiece material, the surface indentations in the workpiece surface resulting therefrom consist of a plurality of intermittent arcuate depressions radially spaced about the axis of the fastener and bore of the workpiece.

Figure 19:
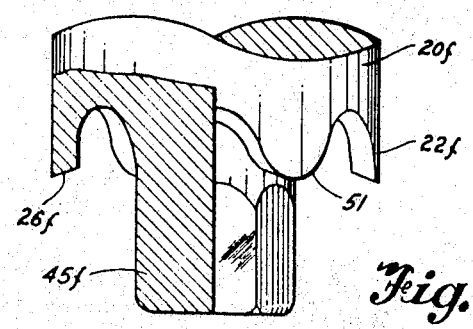
FIG. 19 is an elevational view, partly sectioned, of a combination driving and locking tool similar to that illustrated in FIGS. 17 and 18, except that the penetrating portion thereof is provided with a scalloped edge.

FIG. 19 shows the embodiment of the invention of a combined driving and locking tool 20f as illustrated in FIGS. 17 and 18, except that the penetrating portion 22f is provided with a scalloped edge 51 rather than the rectangular notch edge as illustrated in FIGS. 17 and 18. Although the workpiece surface depressions resulting from the use of the tool of FIG. 19 would result in a plurality of intermittent surface depressions radially spaced about the axis of the fastener and bore of the workpiece, the depth of the depressions is not uniform but is intermittently varied to correspond to the matching scallops of the edge of the penetrating portion 22f.

It is understood that although the fasteners above described are shown with closely spaced saw-tooth like serrations on the collars thereof, said serrations may be of any configuration, i.e., longitudinally extending rectangular notches having a flat base rather than a root apex.

While several embodiments of the invention and their use have been described, it is understood that the particular embodiments of the invention herein disclosed are for illustrative purposes only, and that various changes may be made therein without departing from the principles of the invention or the scope of the annexed claims.

I claim:
1. A tool for effecting permanent locking of a threaded fastener in a workpiece, comprising:
   a body;
   pilot means provided by said body, said pilot means adapted to cooperate with said fastener so as to properly position said tool relative to said fastener; and
   an annular workpiece penetrating element longitudinally projecting from said body, said workpiece penetrating element being formed with generally cylindrical internal and external surfaces concentric with the axis of said tool and having a lower frusto-conical wall which intersects said cylindrical surface and converges in a direction away from the axis of the fastener at a steep angle relative to the axis of said tool, said workpiece penetrating element being further provided with longitudinal flutes, said workpiece penetrating element adapted to penetrate the surface of the workpiece material thereby effecting inward flow of a portion of said workpiece material into locking relationship with said fastener.

2. A tool for effecting permanent locking of a threaded fastener in a workpiece, comprising:
   a body;
   pilot means provided by said body, said pilot means adapted to cooperate with said fastener so as to properly position said tool relative to said fastener; and
   an annular workpiece penetrating element longitudinally projecting from said body, said workpiece penetrating element being formed with generally cylindrical internal and external surfaces concentric with the axis of said tool and having a lower frusto-conical wall which intersects said cylindrical surface and converges in a direction away from the axis of the fastener at a steep angle relative to the axis of said tool, said workpiece penetrating element being provided with longitudinal rectangular slots, said workpiece penetrating element adapted to penetrate the surface of the workpiece material thereby effecting inward flow of a portion of said workpiece material into locking relationship with said fastener.

3. A tool for effecting permanent locking of a threaded fastener in a workpiece, comprising:
   a body;
   pilot means provided by said body, said pilot means adapted to cooperate with said fastener so as to properly position said tool relative to said fastener; and
   an annular workpiece penetrating element longitudinally projecting from said body, said workpiece penetrating element being formed with generally cylindrical internal and external surfaces concentric with the axis of said tool and having a lower frusto-conical wall which intersects said cylindrical surface and converges in a direction away from the axis of the fastener at a steep angle relative to the axis of said tool, said workpiece penetrating element having a scalloped edge configuration, said workpiece penetrating element adapted to penetrate the surface of the workpiece material thereby effecting inward flow of a portion of said workpiece material into locking relationship with said fastener.

References Cited
UNITED STATES PATENTS

| | | | |
|---|---|---|---|
| 2,138,404 | 11/1938 | Haas | 29—509 |
| 2,780,265 | 2/1957 | Brancato | 151—41.73 |
| 2,949,142 | 8/1960 | Sumerak | 151—41.73 |
| 2,984,279 | 5/1961 | Rosan | 151—41.73 |

OTHELL M. SIMPSON, *Primary Examiner.*